(12) United States Patent
Evanno et al.

(10) Patent No.: US 8,225,813 B2
(45) Date of Patent: Jul. 24, 2012

(54) ARRANGEMENT FOR CONTROLLING FLOW OF FLUID TO A GAS TURBINE ENGINE COMPONENT

(75) Inventors: Nicolas M P Evanno, Hilton (GB); John R Webster, Derby (GB); Paul W Ferra, Derby (GB)

(73) Assignee: Rolls-Royce PLC, London (GB)

( * ) Notice: Subject to any disclaimer, the term of this patent is extended or adjusted under 35 U.S.C. 154(b) by 429 days.

(21) Appl. No.: 12/450,396

(22) PCT Filed: Mar. 28, 2008

(86) PCT No.: PCT/GB2008/001073
§ 371 (c)(1),
(2), (4) Date: Sep. 24, 2009

(87) PCT Pub. No.: WO2008/132426
PCT Pub. Date: Nov. 6, 2008

(65) Prior Publication Data
US 2010/0043899 A1 Feb. 25, 2010

(30) Foreign Application Priority Data
Apr. 25, 2007 (GB) .................................. 0707967.6

(51) Int. Cl.
*F16K 17/38* (2006.01)
(52) U.S. Cl. ...... 137/468; 137/485; 137/810; 251/30.01
(58) Field of Classification Search ............ 236/88, 236/93 R; 60/785; 137/468, 485, 487.5, 137/808–812; 251/11, 30.01, 65, 129.15
See application file for complete search history.

(56) References Cited

U.S. PATENT DOCUMENTS

| 2,212,762 | A | * | 8/1940 | Wittmann | 137/495 |
| 2,232,502 | A | | 2/1941 | Wittmann | |
| RE23,675 | E | * | 6/1953 | Spence | 137/485 |
| 2,649,114 | A | | 8/1953 | Wittmann | |
| 2,719,197 | A | * | 9/1955 | Hall et al. | 335/208 |
| 2,906,494 | A | * | 9/1959 | Mccarty et al. | 416/96 R |
| 2,977,090 | A | * | 3/1961 | Mccarty et al. | 416/96 R |
| 3,195,303 | A | * | 7/1965 | Widell | 60/231 |
| 3,507,296 | A | * | 4/1970 | Fix et al. | 137/810 |
| 4,407,448 | A | * | 10/1983 | Yamanaka et al. | 236/88 |
| 4,807,433 | A | * | 2/1989 | Maclin et al. | 60/795 |
| 7,752,849 | B2 | * | 7/2010 | Webster et al. | 60/785 |
| 2001/0003286 | A1 | * | 6/2001 | Philippbar et al. | 137/624.12 |

FOREIGN PATENT DOCUMENTS

| EP | 1 632 649 A2 | 3/2006 |
| EP | 1 845 294 A2 | 10/2007 |
| GB | 1156017 | 6/1969 |

* cited by examiner

*Primary Examiner* — John K Fristoe, Jr.
*Assistant Examiner* — Jessica Cahill
(74) *Attorney, Agent, or Firm* — Oliff & Berridge, PLC

(57) ABSTRACT

An arrangement for controlling flow of fluid to at least one component of a gas turbine engine, the arrangement includes a first conduit for providing fluid to the component; a flow valve, for controlling the flow of fluid in the first conduit, having first and second configurations; a second conduit for providing fluid to the flow valve to the control the configuration of the flow valve; and a magnetic valve, for controlling the flow of fluid in the second conduit, having first and second configurations and including at least one ferromagnet forming a portion of a magnetic circuit; the member comprising ferromagnetic material is thermally coupled to one of the group comprising the fluid in the first conduit, the fluid in the second conduit and the component; and the configuration of the flow valve is dependent on the configuration of the magnetic valve.

7 Claims, 3 Drawing Sheets

ARRANGEMENT FOR CONTROLLING FLOW OF FLUID TO A GAS TURBINE ENGINE COMPONENT

BACKGROUND

The present invention relates to an arrangement for controlling flow of fluid to a component of a gas turbine engine.

Components in a gas turbine engine are subject to elevated temperatures, often above the melting point of the material or materials from which they are formed. Hence there is a need for cooling of these components, which is conventionally provided by film or impingement cooling of the hot components using relatively cool air ducted from one or more compressor stages. The extraction of air from the compressor stages reduces the amount of air available as working fluid to be supplied to the combustor and turbines of the gas turbine engine. Typically 5 to 10% of the compressed air at an intermediate pressure compressor stage may be extracted to provide cooling to turbine rotor blades and turbine stator guide vanes of one or more turbine stages.

Such cooling systems must be rated for the highest temperature condition in the engine cycle, usually at take-off and maximum climb. However, at other times in the engine cycle, particularly at cruise, less cooling is required. Therefore, it is desirable to modulate the amount of air extracted during these periods to the minimum required to provide adequate cooling. Thus, more air remains as working fluid in the gas turbine engine and hence more output power is achieved.

One known method of modulating the flow of cooling fluid, depending on the engine cycle condition, is detailed in EP 1,632,649 and comprises a magnetic valve located in the cooling air supply conduit. The magnetic valve has at least one member that comprises a ferromagnetic material. The valve has a first configuration in which the valve at least partially restricts the supply conduit and a second configuration in which the supply conduit is substantially unrestricted. The configuration of the valve is dependent on the temperature of the ferromagnetic material.

In one embodiment of this prior art, in an inline magnetic valve 10, as shown in FIG. 1, the ferromagnetic material 14 is a block located within an enlarged portion of a supply conduit 12 and in thermal contact, therefore, with the flow of a cooling fluid shown by arrow 16. A permanent magnet 18, or an electromagnet, surrounds the enlarged portion of the supply conduit 12 so that, when the ferromagnetic material 14 is below its Curie temperature, the ferromagnetic material block 14 at least partially restricts the flow of cooling fluid 16. When the temperature of the fluid, and therefore of the ferromagnetic material block 14, increases towards the Curie temperature of the block 14, the block 14 loses its magnetism and is pushed along the conduit 12 by fluid pressure or another mechanism. Stops 20 may be provided to support the block 14 such that the fluid flow 16 is substantially unrestricted through the conduit 12.

One problem with this method of modulating the cooling fluid flow is that the magnets required to resist the fluid flow are large. This means that they have a large thermal inertia and, therefore, the response time of the valve is relatively long; typically in the order of a few seconds. In some applications, particularly within gas turbine engines, this is unacceptably long.

Another problem with this method of modulating the cooling fluid flow is that the valve components are bulky and heavy. In some applications, particularly within the core of a gas turbine engine, there is little space to accommodate additional components and weight is critical.

SUMMARY

The present invention seeks to provide an arrangement for controlling flow of fluid to a gas turbine engine component that seeks to address the above mentioned problems.

Accordingly the present invention provides an arrangement for controlling flow of fluid to at least one component of a gas turbine engine, the arrangement comprising:

a first conduit, coupled to a supply of fluid, for providing fluid to the component of the gas turbine engine;

a flow valve, for controlling the flow of fluid in the first conduit, the flow valve having a first configuration in which the first conduit is substantially open and a second configuration in which the first conduit is at least partially restricted;

a second conduit, for providing fluid to the flow valve to control the configuration of the flow valve; and a magnetic valve for controlling the flow of fluid in the second conduit, the magnetic valve having a first configuration in which the second conduit is substantially restricted and a second configuration in which the second conduit is substantially open, the magnetic valve including at least one member comprising ferromagnetic material, the ferromagnetic material forming a portion of a magnetic circuit, whereby the configuration of the magnetic valve is dependent on the temperature of the ferromagnetic material;

the member comprising ferromagnetic material (68) is thermally coupled to one of the group comprising the fluid in the first conduit (24), the fluid in the second conduit (54) and the component; and the configuration of the flow valve is dependent on the configuration of the magnetic valve.

Preferably the second conduit is coupled to the first conduit.

Preferably the fluid is compressed air of a gas turbine engine.

Preferably the component is any one of the group comprising a turbine blade tip seal, a turbine rotor blade, a turbine stator vane, a nozzle guide vane, an oil cooler, a combustion system and a bearing.

Preferably the flow valve is a pneumatic valve. Alternatively, the flow valve is a ball valve. Alternatively the flow valve is a rotating vortex generator.

Preferably the flow valve is in its first configuration when the magnetic valve is in its first configuration. Alternatively, the flow valve is in its second configuration when the magnetic valve is in its first configuration.

BRIEF DESCRIPTION OF THE DRAWINGS

The present invention will be more fully described by way of example with reference to the accompanying drawings, in which.

DETAILED DESCRIPTION OF EMBODIMENTS

Figure 1:
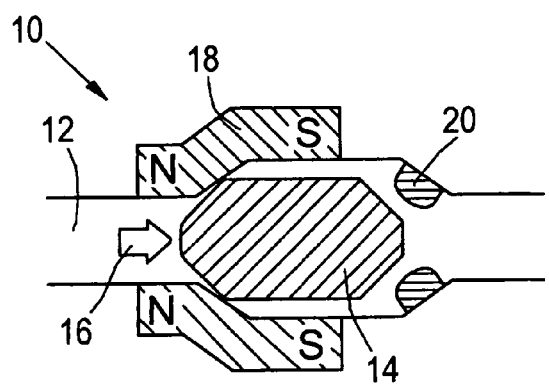
FIG. 1 is a schematic side view of an inline magnetic valve according to the prior art.
Figure 2:
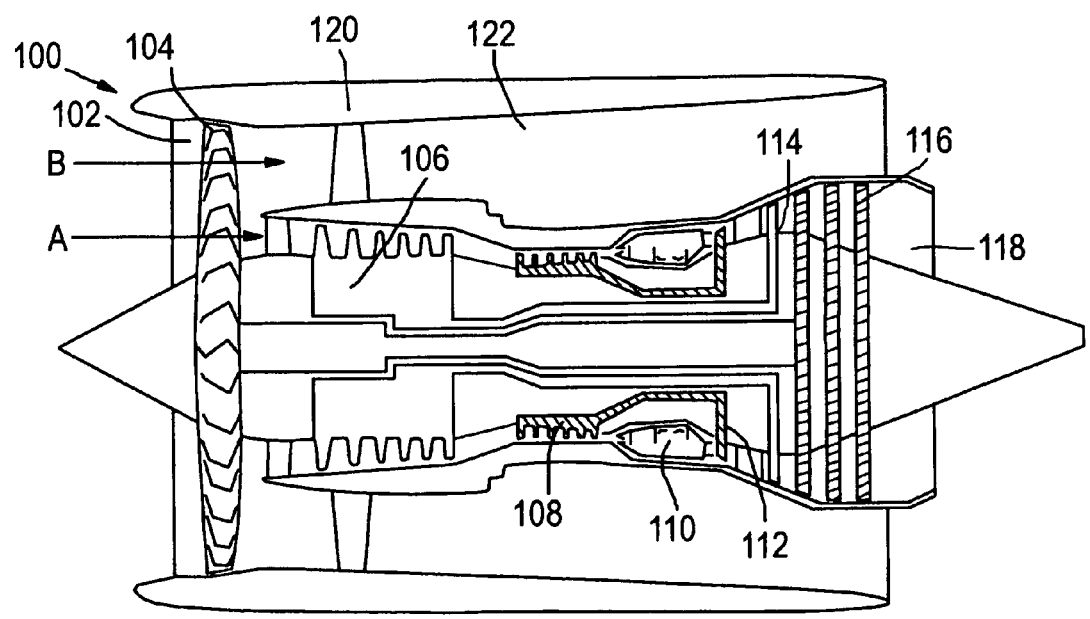
FIG. 2 is a sectional side view of a gas turbine engine incorporating a magnovalve servo controller according to the present invention.

A gas turbine engine 100 is shown in FIG. 2 and comprises an air intake 102 and a propulsive fan 104 that generates two airflows A and B. The gas turbine engine 100 comprises, in axial flow A, an intermediate pressure compressor 106, a high pressure compressor 108, a combustor 110, a high pressure turbine 112, an intermediate pressure turbine 114, a low pressure turbine 116 and an exhaust nozzle 118. A nacelle 120 surrounds the gas turbine engine 100 and defines, in axial flow B, a bypass duct 122. Air may be extracted from a compressor stage 106, 108, or the bypass duct 122 and be selectively passed to a turbine stage 112, 114, 116 for cooling the turbine stage 112, 114, 116 via an arrangement according to the present invention. An exemplary embodiment of the present invention is shown in detail in FIG. 3 and FIG. 4.

Figure 3:
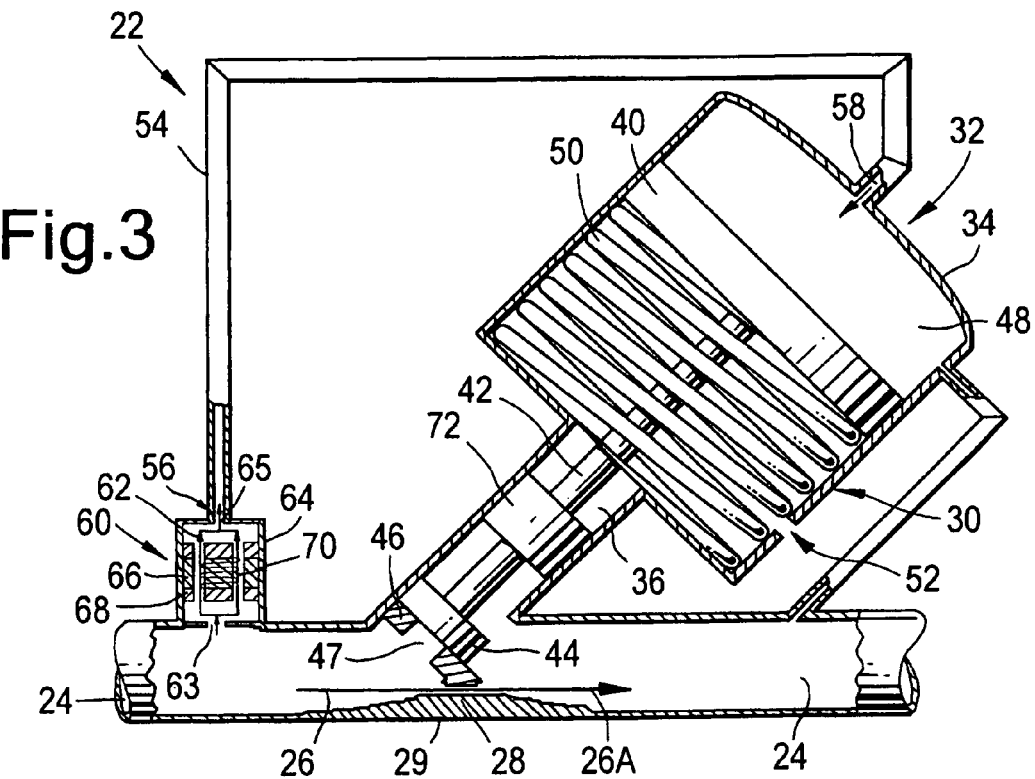
FIG. 3 is a schematic side view of a first embodiment of a magnovalve servo controller in a first configuration, according to the present invention.

FIG. 3 depicts a first embodiment of a magnovalve servo controller arrangement 22, in a first configuration, comprising a first conduit 24 that is coupled to a supply of cooling fluid and a component of a gas turbine engine that requires cooling for at least some of the engine cycle. The component may be a turbine blade tip seal, a turbine rotor blade, a turbine stator vane or a turbine nozzle guide vane. There is a flow of cooling fluid through the first conduit 24 from left to right, as shown by arrow 26. The first conduit 24 may further comprise an obstructing portion 28. The obstructing portion 28 diverts the cooling fluid flow 26 into two flows, a first flow 26A that is unrestricted (the only flow shown in FIG. 3) and a second flow 26B that is selectively restricted by a flow valve 30 as described in detail hereafter.

The flow valve 30 may be any standard valve that, in operation, may be moved reversibly between a first configuration (FIG. 3) in which the first conduit 24 is at least partially restricted and a second configuration (FIG. 4) in which the first conduit 24 is substantially open. In this example, the flow valve 30 is a pneumatic valve arrangement comprising a housing 32 having a substantially cylindrical main section 34 and a smaller diameter cylindrical second section 36 extending towards the first conduit 24. A piston 38 is located within the housing 32. The piston 38 comprises a disc 40 at a first end of a shaft 42 and a disc-shaped closing member 44 at a second end of the shaft 42. The disc 40 is located in the main section 34 of the housing 32. The shaft 42 extends from the disc 40 towards the first conduit 24 through the centre of the main section 34 and the second section 36. The disc-shaped closing member 44 is located at the second, opposite end of the shaft 42 so that in the first configuration of the flow valve 30 (FIG. 3) the closing member 44 abuts an abutment portion 46 of the obstruction portion 28. The abutment portion 46 has an aperture 47 which is closed by the closing member 44. Hence the fluid flow 26 is prevented from passing through the abutment portion 46 and therefore the first conduit 24 is substantially restricted. In this example a small amount of fluid flow 26A along the first conduit 24 is allowed, by providing suitable apertures 29 in the obstruction portion 28, either to provide reduced cooling flow to the component of the gas turbine engine or to ensure that there is flow along the first conduit 24 and not static fluid.

A cavity 48 is provided within the housing 32 between the top of the main section 34 of the housing 32 (distal to the second section 36) and the piston disc 40. The purpose of this cavity 48 will become apparent from the following description. A guide member 72 is located within the second section 36 to guide the shaft 42 to maintain concentricity therewith.

The guide member 72 also acts as a seal to separate the pressure in the volume in the flow valve 30 in which a spring 50 resides and the pressure in the first conduit 24. The compression spring 50 is located within the main section 34 and is bounded at its upper end by the disc 40 and at the lower end by the bottom of the main section 34 of the housing 32. The purpose of the spring 50 is to bias the piston 38 to the position shown in FIG. 4 in which the closing member 44 no longer abuts the abutment portion 46, so the closing member 44 does not close the aperture 47, and a fluid flow 26B is allowed through the aperture 47. The spring 50 is in its most compressed state in FIG. 3. An air vent 52 is provided in the lower part of the wall of the main section 34, towards the second section 36, to enable air to escape or ingress when the piston 38 is moved, thereby altering the volume in which the spring 50 resides.

A second conduit 54 is coupled at a first end 56 to the first conduit 24 upstream of the flow valve 30 and is coupled at its second (opposite) end 58 to the cavity 48 in the main section 34 of the flow valve housing 32. In circumstances to be described below, this second conduit 54 allows a flow of the cooling fluid from upstream of the flow valve 30 to be provided to the cavity 48 to move the piston 38 against the spring 50 towards the first conduit 24 and into the first configuration shown in FIG. 3.

A magnetic valve 60, or magnovalve, is provided at the first end 56 of the second conduit 54. This may take any known form, for example one of those described in EP 1,632,649, the teaching of which is incorporated herein by reference. The magnovalve 60 is small relative to the flow valve 30. In the embodiment shown in FIG. 3 the magnovalve 60 comprises a cylindrical housing 64 defining at least one flow path 62 between the first and second conduits 24, 54. The housing 64 defines an aperture 63 in its lower end, to provide fluid communication with the first conduit 24, and an aperture 65 in its upper end to provide fluid communication with the second conduit 54.

A permanent magnet 66, or an electromagnet, is provided within the housing 64. This may define apertures or other means to enable fluid to flow through the aforementioned flow path or paths 62. A ferromagnet 68, being a block of ferromagnetic material, is provided adjacent to the permanent magnet 66 with a substantially identical profile perpendicular to the direction of fluid flow. It is thermally coupled to the fluid flowing through the conduits 24, 54 and the magnovalve 60. In the first configuration, FIG. 3, the ferromagnet 68 is below its Curie temperature and is therefore magnetic. Hence it is attracted to the permanent magnet 66 and so the aperture 63 in the lower end of the housing 64 is substantially unrestricted. Fluid is able to flow from the first conduit 24 along the flow paths 62 through the magnets 66, 68 and into the second conduit 54. This provides fluid into the cavity 48 of the flow valve 30 which offers sufficient fluid pressure on the disc 40 to compress the spring 50 and to move the piston 38 to the first configuration, having the closing member 44 abutting the abutment portion 46 and thereby blocking the aperture 47 therein.

Figure 4:
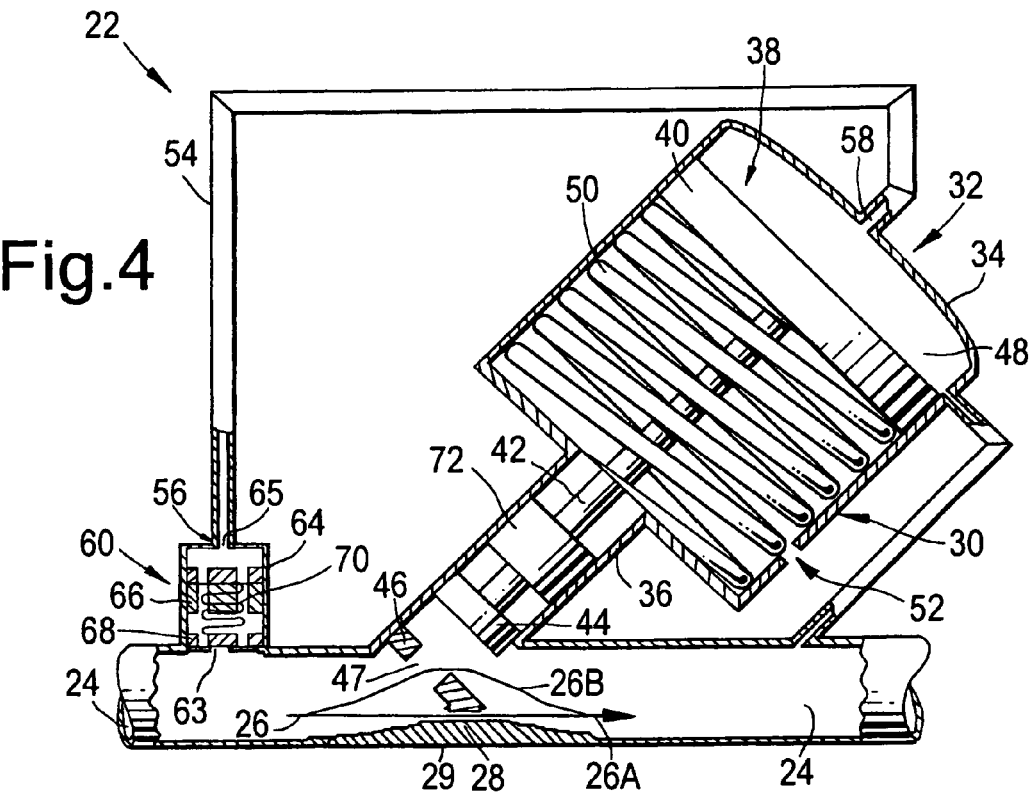
FIG. 4 is a schematic side view of a first embodiment of a magnovalve servo controller in a second configuration, according to the present invention.

FIG. 4 shows the first embodiment of the magnovalve servo controller arrangement 22 in the second configuration. In this second configuration the ferromagnet 68 has been heated towards or beyond its Curie temperature and has therefore lost its magnetism. Hence it is no longer attracted to the permanent magnet 66 and is therefore moved away, either by gravity or by a compression spring 70, until it contacts the lower end of the housing 64. The shape of the ferromagnet 68 is such that in this position it blocks the aperture 63 providing fluid communication between the first conduit 24 and the magnovalve 60, second conduit 54 and flow valve 30. Hence, no fluid can pass to the cavity 48 of the flow valve 30 and the compression spring 50 pushes the piston 38 into the second configuration.

Thus, the closing member 44 is retracted into the second section 36 of the housing 32 and is therefore clear of the aperture 47 in the abutment portion 46 so that the fluid flow 26B through the first conduit 24 is substantially unrestricted.

It can be seen from the foregoing description that the magnovalve 60 need only be large enough that the components operate as desired to activate the flow valve 30. The magnovalve 60 acts to control the configuration of the flow valve 30. The magnovalve 60 is relatively small and light meaning that the problems of heavy and/or bulky components are reduced. The flow valve 30 may be any suitable valve, such as a pneumatic valve, which can operate in the required high temperature environment. This reduces or eliminates the problem of the magnetic materials comprising the magnovalve needing to function at potentially very high temperatures, often for extended periods. Whilst the ferromagnet 68 must still be exposed to the fluid, or coupled to a hot component, the magnovalve 60 may be situated remotely from the component and thereby experience less radiated heat. This has benefits in terms of the life of the magnets.

Although the present invention has been described as having a pneumatic flow valve, it may be any suitable alternative flow valve. For example, a ball valve may be substituted with equal felicity. Similarly, only one embodiment of the magnovalve has been described in detail. However, it will be understood that any embodiment of a magnovalve, including but not limited to those described in the aforementioned EP 1,632,649, may be used to control the configuration of the flow valve. In particular, the magnovalve may be arranged so that the ferromagnet 68 is thermally coupled to the component of the gas turbine engine to be cooled, for example by ferromagnet tracks within or on the surface of the component, rather than being thermally coupled to the cooling fluid. In this case the fluid provided to the cavity 48 to move the piston 38 may be the cooling fluid, as shown in FIG. 3 or FIG. 4, or it may be another fluid flow.

Figure 5:
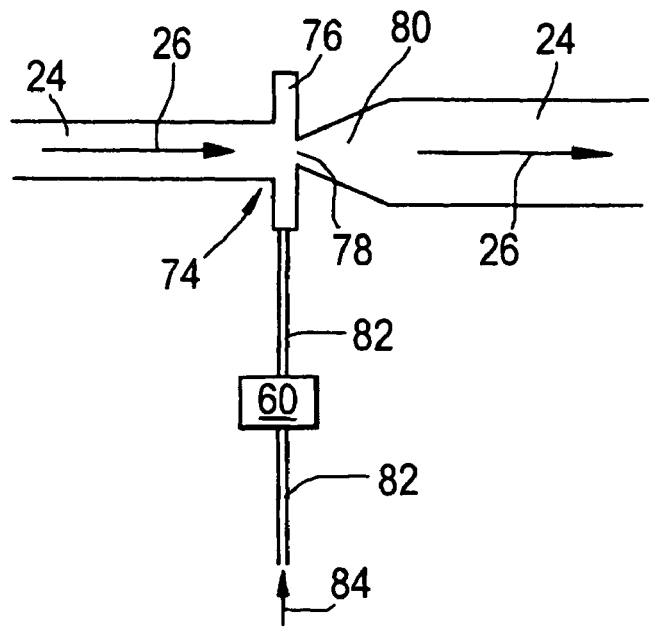
FIG. 5 is a schematic side view of a second embodiment of a magnovalve servo controller in a first configuration, according to the present invention.

FIG. 5 shows a second embodiment of a magnovalve 60 that controls a servo flow valve arrangement located in a first conduit 24. In this case, the servo flow valve is a vortex amplifier 74 that works in a conventional manner. Thus, the first conduit 24 extends both upstream and downstream of the vortex amplifier 74 and contains a flow of cooling fluid 26. The vortex amplifier 74 comprises a vortex chamber 76 followed, in the direction of fluid flow, by a restricted throat 78 and an expanding portion 80. The vortex chamber 76 is generally circular and has a larger radius than the first conduit 24. The first conduit 24 has a constant cross-section and radius, and is connected to the centre of the vortex chamber 76. Therefore, the walls defining the expanding portion 80 make a divergent angle to join the restricted throat 78 to the downstream section of the first conduit 24.

The vortex chamber 76 of the vortex amplifier 74 is supplied by at least one supply conduit 82. Only one supply conduit 82 is shown to aid clarity, however, it will be understood by the skilled reader that preferably four supply conduits 82 or another suitable number of supply conduits 82 are provided and are equiangularly spaced around the vortex chamber 76. All references to a supply conduit should be understood also to refer to multiple supply conduits 82. High-pressure fluid 84 is supplied through the supply conduit 82. The supply conduits 82 are arranged tangentially to the vortex chamber 76 to generate a vortex 86 in the vortex chamber 76 when there is a supply of high-pressure fluid 84 along the supply conduit 82. In the configuration shown in FIG. 5 the magnovalve 60, which can be any suitable type as previously discussed, is arranged to prevent the high-pressure fluid 84 from reaching the vortex chamber 76. The temperature of the high-pressure fluid 84, the temperature of the cooling fluid flow 26, the temperature of another fluid flow or the temperature of the component to be cooled or another component may activate the magnovalve 60. Hence, the cooling fluid flow 26 is able to flow unimpeded through the first conduit 24 and vortex amplifier 74.

Figure 6:
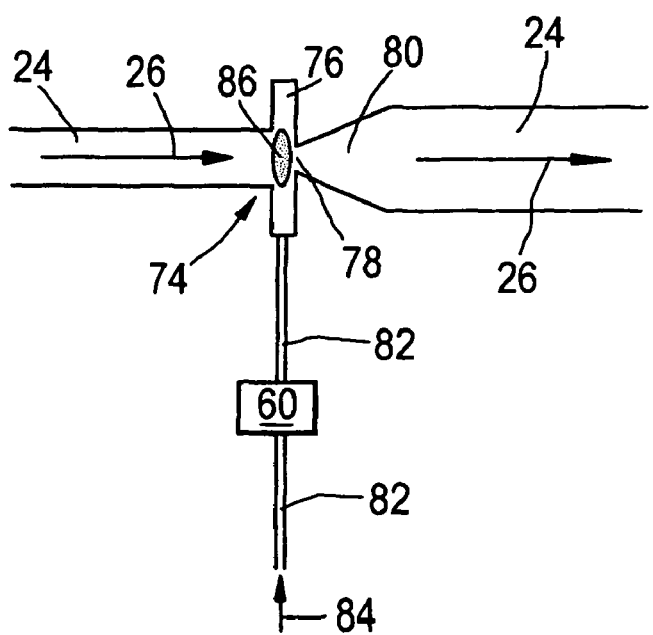
FIG. 6 is a schematic side view of a second embodiment of a magnovalve servo controller in a second configuration, according to the present invention.

FIG. 6 shows the same second embodiment arrangement as in FIG. 5, but with the vortex amplifier 74 in a second, closed configuration. The magnovalve 60 is arranged to allow the high-pressure fluid 84 to flow through the supply conduit 82 to reach the vortex chamber 76 of the vortex amplifier 74. The high-pressure fluid 84 creates a vortex 86 that is contained by the vortex chamber 76. Since the vortex 86 is at a higher pressure than the cooling fluid flow 26, the throat 78 is blocked and no cooling fluid can flow through the throat 78 and expanding portion 80 into the downstream section of the first conduit 24. Thus, the vortex amplifier 74 is closed. A vortex amplifier 74, such as that shown in FIG. 5 and FIG. 6, may also be known as a rotating vortex generator.

Preferably, the magnovalve 60 is in its cold, closed configuration in FIG. 5 and in its hot, open configuration in FIG. 6. However, it may be arranged so that the hot and cold states are swapped relative to the closed and open configurations, or relative to the configuration of vortex amplifier 74.

In a preferred embodiment, the cooling fluid is air extracted from a compressor stage of the gas turbine engine. Alternatively, it may be air extracted from the bypass duct, or ambient air. In this case it may be necessary to use a magnovalve having thermal coupling to the component to be cooled, as the temperature of the cooling air will not be representative of the temperature of that component. Alternatively, the cooling fluid provided to one or more components requiring cooling may be, for example, oil or fuel.

Although the component has been described as being a turbine blade tip seal, turbine rotor blade, turbine stator vane, turbine nozzle guide vane, oil cooler, combustion system or a bearing it may equally be any other component requiring cooling. For example, it may be a combustor casing.

Although the present invention has been described with respect to providing cooling to a component, it is equally appropriate to use it to selectively provide any fluid to a component that needs differing amounts of that fluid depending on the temperature of the fluid, the component or another fluid or component. For example, the present invention could be employed to provide warmed fluid to a component to assist in starting only when that component is below a given temperature. In this case, the components of the magnovalve 60 would be arranged so that the magnovalve causes the first conduit 24 to be substantially unobstructed below the Curie temperature of the ferromagnet 68 and to be substantially restricted near and above the Curie temperature. Alternatively, the present invention can be used in an anti-icing system to provide warming or heating to parts of a gas turbine engine, particularly the nozzle and air intake components, to prevent ice forming.

The magnovalve 60 and flow valve 30 have been described as having substantially cylindrical housing. However, any other suitable shape may be substituted without prejudice. For example, a substantially cuboid housing may be more compact and easier to manufacture.

Although the present invention has been described as providing a cooling, or heating, flow of fluid to a component of a gas turbine engine it may be employed with equal felicity for other purposes. For example, a magnovalve may control a vortex amplifier, as shown in FIG. 5 and FIG. 6, to provide a pressure balance to an end load bearing.

The invention claimed is:

1. An arrangement for controlling flow of fluid to at least one component of a gas turbine engine, the arrangement comprising:
   a first conduit, coupled to a supply of fluid, for providing fluid to the component of the gas turbine engine;
   a flow valve, for controlling the flow of fluid in the first conduit, the flow valve having a first configuration in which the first conduit is substantially open and a second configuration in which the first conduit is at least partially restricted;
   a second conduit, for providing fluid to the flow valve to control the configuration of the flow valve; and
   a magnetic valve for controlling the flow of fluid in the second conduit and the flow valve, the magnetic valve having a first configuration in which the second conduit is substantially restricted and a second configuration in which the second conduit is substantially open,
   the magnetic valve including at least one member comprising ferromagnetic material,
   the ferromagnetic material forming a portion of a magnetic circuit, whereby the configuration of the magnetic valve is dependent on the temperature of the ferromagnetic material,
   the temperature of the ferromagnetic material being varied by at least one of the fluid in the first conduit, fluid in the second conduit and fluid in the magnetic valve, and
   the configuration of the flow valve is dependent on the configuration of the magnetic valve.

2. An arrangement as claimed in claim 1 wherein the second conduit is coupled to the first conduit.

3. An arrangement as claimed in claim 1 wherein the fluid is compressed air of a gas turbine engine.

4. An arrangement as claimed in claim 1 wherein the flow valve is a pneumatic valve.

5. An arrangement as claimed in claim 1 wherein the flow valve is a rotating vortex generator.

6. An arrangement as claimed in claim 1 wherein the flow valve is in its first configuration when the magnetic valve is in its first configuration.

7. An arrangement as claimed in claim 1 wherein the flow valve is in its second configuration when the magnetic valve is in its first configuration.

\* \* \* \* \*